TRANSDUCER POSITIONING INDEXER IN MAGNETIC DISC RECORDER

Filed Dec. 2, 1966

INVENTOR.
STEPHEN A. LAMBERT
BY
Blair Buckles & Cesari
ATTORNEYS

INVENTOR.
STEPHEN A. LAMBERT
BY
Blair Buckles & Cesari
ATTORNEYS

United States Patent Office 3,530,447

Patented Sept. 22, 1970

3,530,447

TRANSDUCER POSITIONING INDEXER IN MAGNETIC DISC RECORDER

Stephen A. Lambert, Berlin, Mass., assignor to Digital Equipment Corporation, Maynard, Mass.

Filed Dec. 2, 1966, Ser. No. 598,780
Int. Cl. G11b 17/06, 23/42
U.S. Cl. 340—174.1 8 Claims

ABSTRACT OF THE DISCLOSURE

A magnetic disc recorder includes generation of a signal for indexing the recording and reading head. The signal is generated by referencing the head against a hub on the disc itself rather than using a stationary element as a reference. A signal source is also provided for terminating the indexing when the head is positioned at a desired location.

The present invention relates to a magnetic disc recording device. More particularly, it relates to an improved device for recording and reading out data for use by a computer.

While the prior art is replete with the application of grooveless magnetic discs to the storage and retrieval of data for computers, the use of many of such discs interchangeably has caused some problems. This is especially true when discs recorded on one machine are played back on another machine. The machines vary as do eccentricities and radial dimensions of the discs.

Prior to the present invention grooveless discs have had to be machined to very close tolerances in order to obtain proper registration of the magnetic recording and reading head with the "channels" or "tracks" on the disc. The use of grooved discs, like phonograph records, solves this problem. Grooved discs, however, are severely limited in the amount of data they can store. If the distance between grooves is less than a certain finite amount, the "land" between the grooves breaks down and the disc becomes useless.

It is, therefore, an object of this invention to provide a high density data storage magnetic disc recording device with an improved means for indexing the recording and reading head.

Another object of the present invention is to provide a means for synchronizing the indexing of the recording and reading head.

Other objects of the invention will in part be obvious and will in part appear hereinafter.

The invention accordingly comprises the features of construction combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Briefly, in accordance with the present invention, I provide a magnetic disc recording device which includes the generation of a signal for indexing the recording and reading head. In the preferred embodiment of my invention, the signal for indexing the recording and reading head is generated by referencing the head against a point on the disc itself rather than by using a stationary element as a reference. More specifically, the reference point on the disc is used to generate a signal for terminating the operation of the recording and reading head, indexing the motor and reversing its direction. The disc also includes some means for synchronizing the indexing of the recording and reading head with respect to the disc tracks. Finally, a signal source is provided for terminating the indexing when the recording and reading head is positioned at a desired location.

Figure 1:
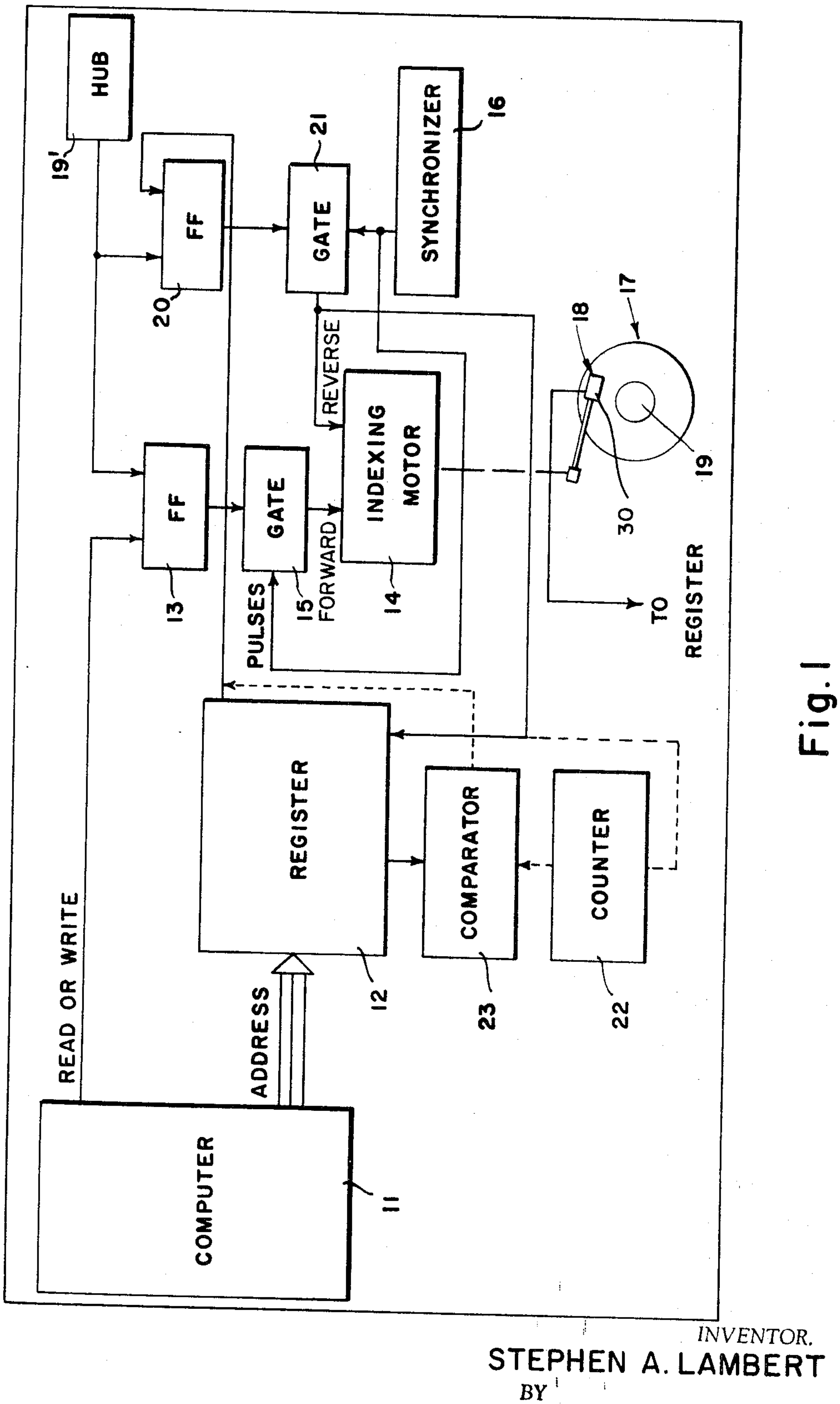
FIG. 1 illustrates, schematically, a system employing the magnetic disc recorling device of the present invention.

In the exemplary system set forth in FIG. 1 a computer 11 loads the register 12 with a number identifying the location on the magnetic disc of the information it desires to record or read out. The computer 11 also generates a signal which sets the flip-flop circuit 13. This, in turn, simultaneously initiates forward operation of the indexing motor 14 and enables the gate 15 to receive over pulses from the synchronizer 16 which are generated with each revolution of the magnetic disc. The indexing motor 14 is geared or otherwise suitably adapted to drive the magnetic head assembly 18. The magnetic head 30 is first indexed from the outer edge of the disc 17 toward its center. This process continues until the head 30 traverses the disc 17 to a reference point, which in this example is the hub 19. When the head 30 contacts a predetermined point on hub 19, as the hub 19 rotates, a signal is generated. This signal resets the flip-flop 13 and sets the flip-flop 20. This in turn reverses the indexing motor 14 and enables the gate 21 to pass pulses from the synchronizer 16.

The pulses from the synchronizer 16 are now fed back into the register 12 causing it to count down to and stop at a number which corresponds to the number loaded into the register 12 by the computer 11. Alternatively, pulses from the synchronizer 16 may be fed into the register 12 through a counter 22 and a comparator 23. In this way, the pulses may be used either to turn back the register 12 to zero, which identifies the point the indexing motor is to be stopped, or fed through the counter 22 and comparator 23 to the register 12, which enables proper indexing of the recording and reading head 30 without having to re-reference the head 30 to the hub 19 each time a new channel is sought.

Figure 2:
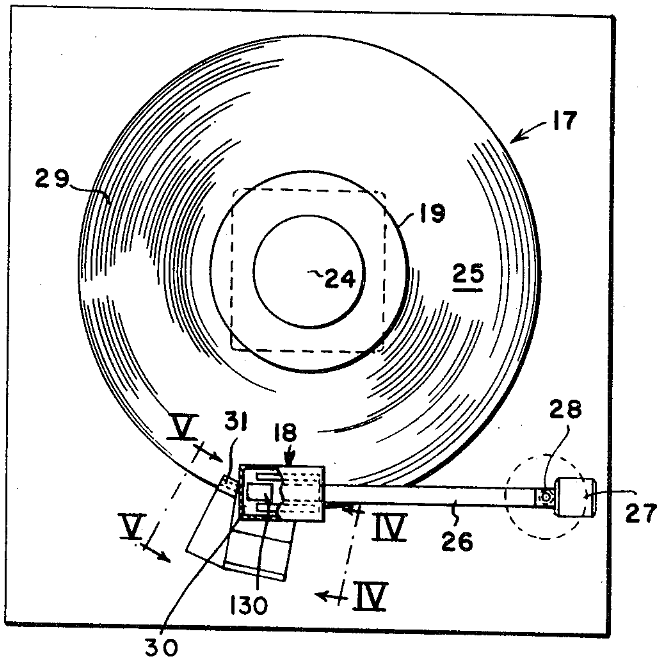
FIG. 2 is a plan view, partly in section, of one embodiment of the magnetic disc recording device of the present invention.

Referring now to FIG. 2, there is here shown a magnetic disc generally indicated at 17. The disc 17 may be made of any suitable structural material including metal, such as brass or aluminum. It may also be constructed of an insulating material including any of a large number of plastic or glass materials.

The disc 17 is provided with a raised hub 19 adapted to secure it for rotation about an axis 24. The hub 19 remains a permanent part of the disc 17.

The surface 25 of the disc 17 is grooveless and is constructed to run true, i.e., without undulations.

The head 30 is preferably arranged both for recording signals onto the disc 17 or reading back such signals to a computer. It is carried by an arm 26 balanced by a counter-weight 27. Movement of the head assembly 18 is controlled by pivoting of the arm 26 about an axis 28. Alternatively, the head 30 may be mounted on and driven by a lead screw, not shown.

As pointed out above, the surface of the disc 17 contains no grooves. The intelligence received is recorded in concentric channels or tracks 29 in a manner well known. These tracks are very closely spaced, e.g. 0.010 inch or less apart to maximize the amount of data that can be stored on a single disc.

As indicated in the description of FIG. 1, the head 30 is indexed from one track to the next in successive steps. Each incremental step of the head assembly 18 is affected by the motor 14 which moves the head 30 one step in response to each pulse it receives from the synchronizer 16. This assures that the head 30 scans each track starting and ending the scan always at the same points.

Figure 3:
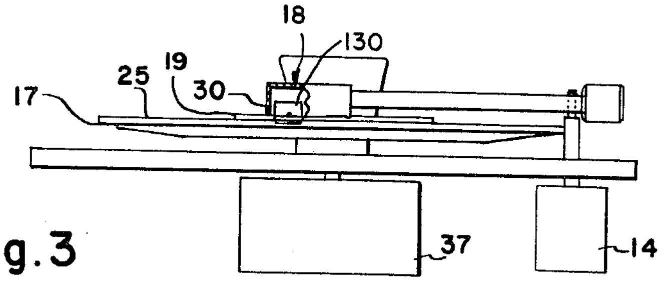
FIG. 3 is an elevational view, partly in section, of the device illustrated in FIG. 2.

In FIG. 3 the construction of the head assembly 18 may be seen more clearly. The principal elements of the head 30 are the coils 130. The coils 130 comprise a core structure having pole pieces separated by a small air gap. The pole pieces extend very close to the surface of the disc 25 but are not in contact therewith. It is desirable that these pole pieces extend to at least within a few ten-thousandths of an inch or closer to the magnetic surface of the rapidly rotating disc 17.

One or more coils of wire are wound on each core. For recording data on the disc 17 an energizing current is supplied by the computer 11 to the coils 130. This creates a magnetic field within the core and across the air gap along the pole pieces. The field changes the magnetic condition of the magnetic material on the disc 17 in accordance with the signal or currents supplied to the coils 130. On the other hand, data is read out by means of voltages induced in the coils 130 when the signals recorded on the magnetic disc pass under the pole pieces.

Figure 4:
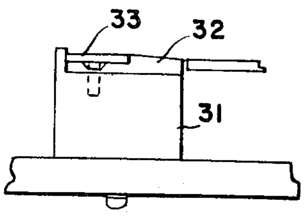
FIG. 4 is an elevational view, partly in section, of a portion of the device illustrated in FIG. 2 taken along line IV—IV.

FIG. 4 illustrates in more detail a resting block 31 with a pad 32 for the arm 26 and a felt insert 33 for the head assembly 18. This typically represents the protective arrangement which is used to protect the head 30 when it is not in use.

While the elements of the magnetic disc recording device have been described above, its operation may be better understood by reference once again to the system in which it is to be used.

Operation of the magnetic disc recording device may be initiated by a read or write signal from the computer 11. This signal then causes the head 30 to index inwardly toward the raised hub 19 which is essentially part of the disc itself. Inward indexing of the head 30 may be incremental in response to pulses from the synchronizer 16 or it may be accomplished in a single sweep by a declutching of the head driving mechanism. Because of its speed, this latter method is preferred. If, however, the head 26 moves toward the hub 19 in a single sweep, a damping mechanism should be employed to slow it down before it strikes the hub 19.

Then too, another alternative indexing method involves the use of perhaps several hundred pulses in very rapid succession from a source other than the synchronizer 16. This would quickly advance or index the head 30 toward the hub 19. Then before the head 30 reaches the hub 19 a switching arrangement would be employed to cause indexing to occur once again in response to the synchronizing pulses. Slowing the head 30 down to this extent should enable it to reference properly against the hub 19 and index back out to the desired track.

When the head 30 contacts the hub 19 it preferably rides against the hub 19 until a signal is received from the synchronizer 16 which is, for example, a photoelectric cell 34. This causes the indexing direction to reverse as pointed out above and the head 30 begins indexing outwardly.

Figure 5:
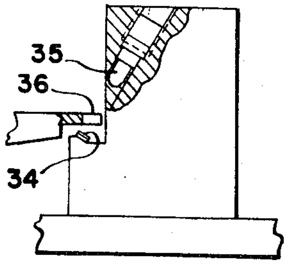
FIG. 5 is an elevational view, partly in section, of a portion of the device illustrated in FIG. 2 taken along the line V—V.

The photoelectric cell 34, which is illustrated in FIG. 5, generates synchronizing pulses with each revolution of the disc 17 in response to light from a source such as light bulb 35. Light from the bulb 35 is transmitted to the photoelectric cell 34 through an aperture 36 located on the edge of the disc 17. Alternatively the photoelectric cell 34 and light source 35 may be located on the same side of the disc. In this case a reflector, not shown, is then placed at a predetermined point on the disc 17 to reflect light from the source 35 into the photoelectric cell 34 which thereby generates the synchronizing pulse. These synchronizing pulses serve a dual function. First, they may be used for indexing of the head 30. Secondly, they are used to indicate the start and finish of the recorded data on each track 29.

The locations of the circumferential tracks 29 are numbered according to their radial distance from the hub 19. Thus when the hub 19, which is fixed with respect to the disc 17, itself is used as a reference, this assures that the head pickup and recording coils will always be in registration with the tracks 29 on the disc 17. More specifically, when the head 30 contacts the hub 19 it remains in contact with the hub 19 while the hub 19 rotates. When a predetermined point on the hub 19 rotates into contact with the head 30 the signal to reverse the indexing direction is generated. It is actually the use of a predetermined point on the hub 19 which compensates for any eccentricity in the disc 17 or hub 19 and enables initiation of head indexing at the same point on each disc independent of the machine with which it is used.

The invention, therefore, has a definite advantage when discs are to be used interchangeably on many different machines. In the past, stationary components on the machine have been used as a reference for initiating indexing and the discs have to be fabricated to very close tolerances in order to obtain registration between the head and the tracks. Even then, the very slightest variations in the discs are apt to cause difficulties where the tracks are very closedly spaced. In my system, referencing against the disc itself eliminates this problem.

Once the head 30 is properly referenced against the disc 17, indexing of the head 30 may then proceed at a very rapid rate. For example, if the disc 17 is driven by an eighteen hundred r.p.m. motor 37 the head 30 will index at eighteen hundred increments per minute. This will permit very rapid location of the desired track. This is especially true for example when comparing this indexing speed to that of devices using tapes for the storage of intelligence.

If the synchronizing signal is fed directly to the register 12 thereby counting it back to zero when the desired track has been located, the indexing head 30 must be moved back to the hub 19 each time a new track is to be scanned. On the other hand, if the synchronizing signals are fed through the counter 22 and thence to the comparator 23, the comparator 23 signal controls the indexing motor 14 and indexing may occur from one track to another for the purpose of scanning without returning the head 30 to the hub 19 each time a new track 29 is desired.

It will thus be seen that the objects set forth above, among those made apparent from the preceding description, are effectively attained, and since certain changes may be made in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:

1. A magnetic disc recording apparatus comprising:

(1) a magnetic disc having a radial reference location thereon;

(2) a magnetic head for recording data onto and reading data from said disc;

(3) driving means for translating said head relative to said disc;

(4) means controlling said driving means for producing movement of said head toward said radial reference location;

(5) means for detecting the arrival of said head at said radial reference location and generating a radial reference signal for inhibiting said controlling means;

(6) means for generating indexing signals;

(7) means responsive to the generation of and conditioned by said reference signal for coupling said indexing signals to said driving means to produce controlled indexing movement of said head away from said radial reference; and (8) means responsive to said indexing signals for inhibiting said reference signal response means when said head arrives at a desired data location on said disc.

2. The apparatus defined in claim 1 wherein said controlling means couples said indexing signals to said driving means for producing controlled movement of said head toward said radial reference location until inhibited by said radial reference signal.

3. The apparatus defined in claim 1, wherein said indexing signals responsive means includes a register holding an address of a desired data location on said disc in terms of its distance from said radial reference location.

4. The apparatus defined in claim 1 wherein said disc radial reference location is constituted by a raised permanent hub on said disc.

5. The apparatus defined in claim 4 wherein (a) said disc carries a plurality of concentric data tracks located in reference to said disc radial reference location, and (b) said indexing signal generating means generates an indexing pulse at a fixed time during each revolution of said disc, (c) each of said indexing pulses coupled to said driving means causing said head to be indexed from one data track to the next adjacent data track.

6. The apparatus defined in claim 5 wherein said disc has an indicia thereon and said indexing signal generating means includes a light source and a photoelectric cell positioned to detect said indicia on said disc as it passes in proximity thereto during each disc revolution, each pasage of said indicia inducing the generation of an indexing pulse.

7. The apparatus defined in claim 5 wherein said indexing signal responsive means includes a register holding an address of a desired data track on said disc in terms of the number of indexing pulses required to index said head thereto from said hub.

8. The apparatus defined in claim 7 wherein said indexing signal responsive means further includes means for accumulating a count of said indexing pulses for comparison with the address in said register, said radial reference signal responsive means being inhibited upon a detection of a comparison equality between the address in said register and the count in said accumulator.

References Cited

UNITED STATES PATENTS

| | | | |
|---|---|---|---|
| 3,426,337 | 2/1969 | Black ------------ | 340—174.1 |
| 3,369,813 | 2/1968 | Nagashima ---------- | 274—15 |
| 3,226,700 | 12/1965 | Miller ----------- | 179—100.2 |

OTHER REFERENCES

J. D. Carothers, "Sector & Index Pulse Generator," IBM Technical Disclosure Bulletin, p. 8, vol. 3, No. 11, April 1961.

BERNARD KONICK, Primary Examiner

J. ROSENBLATT, Assistant Examiner

U.S. Cl. X.R.

177—100.2